US006658404B1

(12) United States Patent
Cecchini (10) Patent No.: US 6,658,404 B1
(45) Date of Patent: Dec. 2, 2003

(54) SINGLE GRAPHICAL APPROACH FOR REPRESENTING AND MERGING BOOLEAN LOGIC AND MATHEMATICAL RELATIONSHIP OPERATORS

(75) Inventor: Albert B. P. Cecchini, Jamestown, NY (US)

(73) Assignee: Libera, Inc., Jamestown, NY (US)

( * ) Notice: Subject to any disclaimer, the term of this patent is extended or adjusted under 35 U.S.C. 154(b) by 0 days.

(21) Appl. No.: 09/399,370

(22) Filed: Sep. 20, 1999

(51) Int. Cl.[7] .............................................. G06F 17/30
(52) U.S. Cl. .......................... 707/3; 345/762; 345/763
(58) Field of Search ................................ 345/835, 968, 345/769, 764, 837, 7, 8, 762, 763; 707/101, 102, 103 R, 103 Y, 103, 103 Z, 104.1, 4, 3

(56) References Cited

U.S. PATENT DOCUMENTS

| 5,175,814 | A | * | 12/1992 | Anick et al. | |
| 5,579,471 | A | * | 11/1996 | Barber et al. | |
| 5,963,938 | A | * | 10/1999 | Wilson et al. | 707/4 |
| 5,966,126 | A | * | 10/1999 | Szabo | 345/348 |
| 5,982,369 | A | * | 11/1999 | Sciammarella et al. | 345/349 |
| 6,028,605 | A | * | 2/2000 | Conrad et al. | 345/534 |
| 6,263,328 | B1 | * | 7/2001 | Coden et al. | 707/3 |
| 6,326,962 | B1 | * | 12/2001 | Szabo | 345/348 |

* cited by examiner

*Primary Examiner*—Kim Vu
*Assistant Examiner*—Tam Nguyen
(74) *Attorney, Agent, or Firm*—McDermott, Will & Emery (57) ABSTRACT

System and method for generating graphic queries which intuitively represent Boolean and evaluation expressions where the graphic language includes "vocabulary", "grammar", "structure", and "meaning". Graphic "sentences" construct queries to databases that denote specific Boolean relationships and evaluation expressions. Items enclosed within graphic objects result in "sentences" based on the shape and/or juxtaposition of the graphic objects, format of the line segments and point size of the graphic objects. The graphic Boolean objects are used to enclose words, values, fields, or other objects thereby generating query syntax. Dictionaries representing the meaning of the graphic syntax can be swapped to produce different syntactical representations.

30 Claims, 6 Drawing Sheets

SINGLE GRAPHICAL APPROACH FOR REPRESENTING AND MERGING BOOLEAN LOGIC AND MATHEMATICAL RELATIONSHIP OPERATORS

BACKGROUND OF THE INVENTION

1. Field of the Invention

The present invention relates to a method and system for graphically representing and merging Boolean logic and mathematical relationship operators. More specifically, for generating search queries.

2. Description of the Prior Art

Whether on paper, CD-ROM, or the Internet, information has been organized into collections known as databases. On paper these databases, though organized into collections, are flowing text and therefore non-structured. In electronic media databases are either structured, non-structured, or hybrid form, where the hybrid form is a database having both structured and non-structured components.

Structured databases are organized into records, each record having discrete fields of information, e.g., an employee data record containing fields such as employee name, address, and salary. In a non-structured database, each item may correspond to an article or legal opinion, which is in free form text. Hybrid format databases include records that contain free form text as well as explicit fields. For example, a database designed to store journal information would include fields such as the date of the article, the name of the authors, and the free flowing article text stored in a memo field.

With the advent of collections of paper based non-structured data, tools were developed to find information because it was too hard to search for something by scanning the information by eye. Similarly, in an electronic collection, it takes too long to scan the information from the beginning to the end of the database. The table of contents and index within books are familiar tools for quickly locating information. The Dewey Decimal System is also a familiar tool for locating information across vast collections of paper within libraries. With the advent of electronic information, it was natural to extend the concepts of a table of contents to electronic outlines or trees with links for non-structured databases or a "TOC" field within a structured database. A book's index was extended to 'indexing' the words of both structured and non-structured databases wherein a table of words was created electronically by scanning the words in the collection. Within this table was the location of the word. In other words, it contained not only the word found but, within what electronic document and the count of where it was with respect to the beginning of the document. Similarly, "indexing" words contained within the fields of structured databases lead to high speed searches of information because the index contained the record number where the word was found. Of course as is the case with a paper collection of information, scanning the information can be electronically modeled by bruit force "matching" searches of databases without the use of an index.

The index of a book however was not limited to single word locations but combinations of words that constituted a concept. For example, a book on birds could contain an index entry on the "Long Necked Geese" and "Canadian Geese". With a simple single word electronic search, searching for "Geese" alone would yield both entries when the user desires only one.

With structured databases the need existed to retrieve records based on counts and amounts. For example, the searcher would desire to see all patrons who owed more then $10.00 and items that had been purchased in quantities less than or equal to 10.

As a result, electronic search engines borrowed from mathematics and Boolean logic to yield syntactical representations for complex searches. The original syntax included left and right parenthesis, and, or, not, quotations, greater than, less than, equals and not equals. In addition, the arrangements of these equational elements dictate the meanings and consequently effect the results. For example, ("Long" AND "Necked" AND "Geese") satisfied the non-structured example above while (OwedField>$10.00 or QuantityField<=10) satisfies the structured database example. Please note that the "OR" in this equational expression is opposite of the "AND" used in the sentence. This syntax is too complicated for the general untrained user. Even the proper placement of parenthesis had significant impact on the result. For example, ("Dog" AND "Cat") OR "Mouse" had a much different result than "Dog" AND ("Cat" OR "Mouse"). Just the concept of 'OR' vs. 'AND' is complex for the general software user to understand. The widespread use of computers to access information by all levels of users and the sheer volume of information that is accessible has placed the burden of simplicity on the technology instead of on the level of sophistication of the user.

In an effort to minimize the complexity in forming particularized queries, different syntactical representations of queries have been developed. The Structured Query Language (SQL) was developed as a standard syntax for searches, for example. The theory is that standardization limits what the user has to learn as they move from software application to application. In addition, it moved the syntax closer to sentence structure and hid the use of indexes from the user. For example, "Select LastName from Clients Where (OwedField>$10.00 OR QuantityField<=10);" performs the same search (i.e. query) as the above example. Please note that though the syntax is different the Boolean and mathematical elements in the expression section of the SQL statement are still present. Obviously, even in this simplest of expressions, it is well beyond the masses.

As a consequence query expression builders have been developed. These expression builders act as a user interface that generates the Boolean and mathematical expressions that in turn defines the search. One example of an expression builder is a natural language query engine, U.S. Pat. No. 5,175,814 to Anick et al, which is incorporated by reference for its teachings. To generate a natural language query, a user forms a basic sentence that describes what they are looking for. A natural language query of the prior example would be something like, "Show me all of the client last names where what they owe is greater than $10 and the quantity of items purchased is less than or equal to 10." This sentence is then translated into a mathematical syntax query, SQL Syntax, or any other search/query syntax. The resultant syntactical output from natural language query generator is then used to locate records in the database meeting the desired criteria. The user may not even see the actual Boolean and evaluation query expression that is used to search the database or, if shown, understand it. As a consequence, the sentence they type for the natural language query may be returning results that the user did not intend to find. The user has limited mechanisms to corroborate that the sentence they typed is providing an expression syntax that matches. This sentence based representation, though rich in "grammar" lacks underlying structure that adds meaning to the interpretation.

To resolve this problem Anick et al supplied a secondary "tile" based interface between the natural language query and the search expression syntax. At the user's request, "tiles" are presented to the user representing each of the Boolean terms in the expression query syntax generated from the natural language query. The user may then manipulate the tiles to modify their initial Natural Language query and in turn the output query expression. While graphic in nature, it is a "flow charting" approach to representing the logic as is evidenced by the need to include logical relationships such as greater than, less than, equal, not equal, and partial matches in text form within the "tile" or flow chart block. This flow diagram representation, though possessing "structure", lacks underlying "grammar" that adds "meaning" to the interpretation. It provides little or no intuitive aid to understanding the underlying Boolean or evaluative relationships between the items used to formulate the search query.

Strong structure and lack of grammar is again evidenced by similar "flow charting" approaches that have been taken in U.S. Pat. No. 5,428,776 to Rothfield and U.S. Pat. No. 5,721,900 to Banning et al, which are incorporated by reference for their teachings. Rothfield applies this approach specifically to SQL syntax generation while Banning et al applies it to expression syntax.

In an attempt at adding grammar to flow charting U.S. Pat. No. 5,701,456 to Jacopi et al, which are incorporated by reference for their teachings, uses the lines of the flow chart arranged in series or parallel as the Boolean components of the expression. This arrangement closely parallels circuit diagrams used in electronics with series and parallel resistors and capacitors. The approach falls short because the complexity of the "grammar" is directly related to the complexity of the query. In other words, the "grammar" is limited due to the complexity of the query, and the added grammar becomes even more complex as the query expression gets complex. In fact, this approach produces expressions that are more difficult to understand than their mathematical or SQL counterparts.

In addition to the above discussion of the "structure" and "grammar" elements in current art, none of the above approaches are purely graphic in nature with respect to logical and mathematical expressions such a >, <, <>, =, etc. Though flow diagrams are using graphic elements, the representations still contain characters that are evaluative in nature.

U.S. Pat. No. 5,592,663 to Nagamori, incorporated by reference teaches a truly graphic mechanism for representing the results of a query in terms of sets. This approach is rich in graphic "grammar" and "structure". The joining of sets of query results in overlays of graphic regions. Overlapping regions represent where the sets of records have common results. Where they do not overlap shows where the record sets are distinct. This is equivalent to the Boolean "and" and "or" operators between record sets. This is the "grammar". Once the rectangular regions are defined they may be manipulated to alter the parameters associated with creating the set of records represented by the region. This is the "structure". The intuitive nature of viewing sets of records graphically is outstanding in this approach. However, generating the different record sets that are represented by the rectangles is still a standard equational element syntax such as (OwedField>$10.00 or QuantityField<=10). This approach is very useful in graphically representing and analyzing the relationships between two or more sets of records that are generated by query expressions. In addition, though this approach contains "grammar" and "structure" it lacks the "meaning" to produce a graphic "language".

SUMMARY OF THE INVENTION

There is a need for an arrangement that enables search queries to be generated without the necessity of a programming language knowledge.

There is also a need for an arrangement that enables intuitive graphic-based objects to be translated into executable queries for a database.

These and other needs are attained by the present invention, where a graphical query generation arrangement receives graphical objects, generated by a graphic user interface, and generates a database search query according to a prescribed syntax based on the query elements.

According to one aspect of the present invention, a method is provided of graphically generating a query expression for use by a database system. The method includes the steps of first generating graphical objects, representing prescribed elements according to a prescribed syntax, in response to user inputs to a graphic user interface, and second generating the query elements from the graphical objects based on a correlation thereof with the prescribed syntax. Generation of the graphical object provides visual feedback to a user of a mouse, keyboard or some other graphical input tool, providing easy input of graphical objects. Moreover, the generation of the query elements based on a correlation of the graphical objects and the prescribed syntax enables users to generate query expressions using graphical paradigms, eliminating the necessity for programming knowledge or advanced search skills. Rather, an intuitive, graphic-based input system may be used, enabling users to generate relatively complex query expressions for database systems with little or no programming or database experience.

Another aspect of the present invention provides an apparatus for generating a search query for a database of records. The apparatus includes a graphic user interface configured for generating graphical objects in response to user inputs, and a graphic query generator. The graphic query generator is configured generating the search query according to a prescribed syntax based on the graphical objects.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numeral designations represent like elements throughout and wherein.

BEST MODE FOR CARRYING OUT THE INVENTION

The disclosed embodiment is directed to an arrangement for generating a search query for a database of information. In particular, a computer or other processor-based system is configured for executing query generation software, configured for generating a search query according to a prescribed syntax based on supplied graphical objects.

Figure 5:
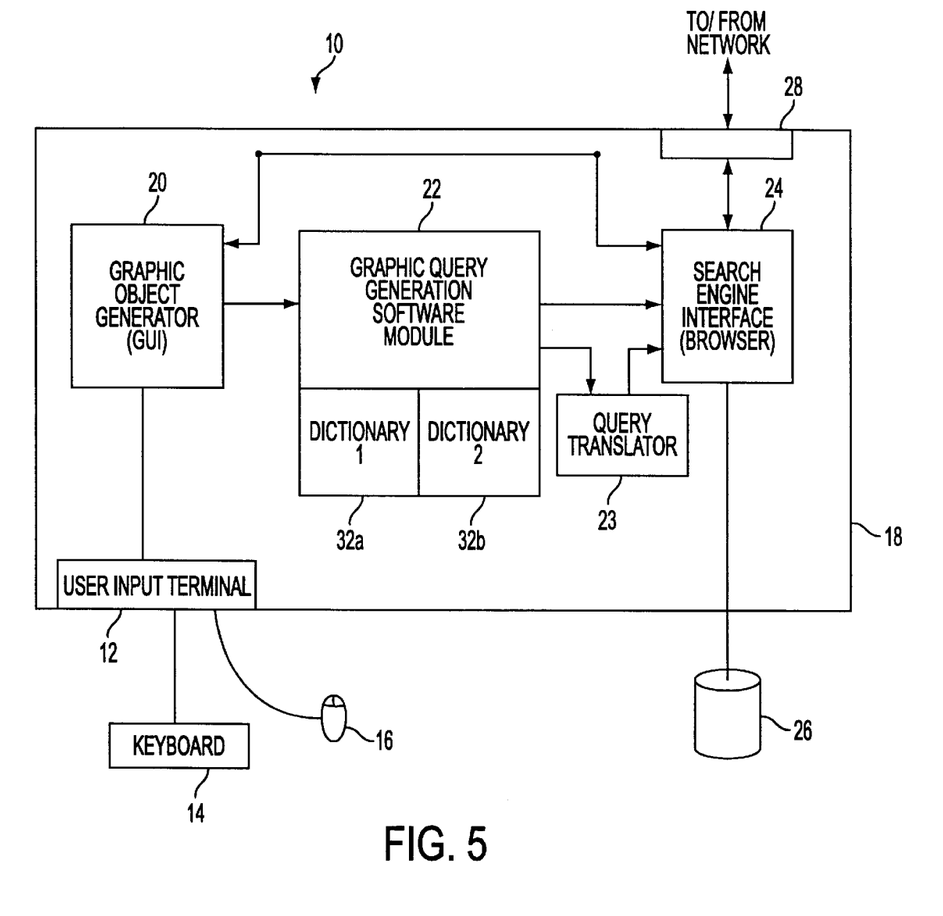
FIG. 5 is a diagram illustrating a system for graphically generating the search queries according to an embodiment of the present invention.

FIG. 5 is a block diagram illustrating an apparatus for generating a search query for a database of records according to an embodiment of the present invention. As shown in FIG. 5, the apparatus 10, for example a personal computer or some other machine having a microprocessor (e.g., a computer-controlled assembly device, such as an automated robot in a manufacturing facility) includes a user input terminal 12 configured for receiving user inputs from either a keyboard 14 or a mouse 16, joystick, or the like. The user input terminal 12 supplies the user inputs in the form of electrical signals to a processor-based computer 18 having a graphic object generator 20 as a graphical user interface (GUI). As recognized in the art, the graphic object generator may be resident within an operating system of the computer 18, or may be a separate application optimized for generating the graphical objects, described below. The computer system 18 also includes graphic query generating software 22, a query translator 23 and a search engine interface 24. The computer 18 also may include a mass storage device, such as a hard disk 26, for storage of data, and a network interface 28 for accessing remote databases.

As described in further detail below, the graphic object generator 20 generates graphical objects, illustrated below with reference to FIGS. 1–4. As shown in FIG. 5, the graphic query generation software 22 obtains the graphical objects from the graphic object generator 20, and decodes the received graphic objects into one or more query elements based on a correlation between the graphical nature of each object and a prescribed syntax, described below. The individual query elements are then combined according to a prescribed logical syntax (i.e., "grammar") to generate the database search query. The database search query is then output from the graphical query generation software 22, as a tokenized data set that specifies the logical and/or expressional relationship between the graphical objects to a query translator 23 or a search engine interface 24. The query translator 23 is configured for converting the tokenized data set into database query expressions having recognized protocols, for example SQL, a natural language and the like, for forwarding the database query expression to the search engine interface 24. As recognized in the art, the search engine interface 24 may be implemented as a network-type browser for accessing remote databases via the network interface 28, or alternately a forms-type input interface for accessing SQL-type databases stored on a mass storage medium 26, for example a hard drive. The interface 24 may also include the translator 23 as a plug-in, capable of converting the tokenized data set.

The query generation software 22 includes at least one dictionary file 32, configured for providing definitions for prescribed graphical objects in order to define the "vocabulary" for the query generation software 22. As shown in FIG. 5, a plurality of dictionary files 32a, 32b may be selected for different users, for example 32a may be especially configured for graphic inputs by children, whereas dictionary 32b is configured for graphic inputs by engineers, scientists, and the like. Hence, the query generation software 22 may use different dictionary files 32, depending on the type of user and/or the type of database being searched.

A more thorough understanding of the operations of the query generation software 22 will become apparent from the following discussion of the syntax and grammar structure of the query generation software 22 relative to the dictionary files 32.

As suggested above, the disclosed embodiment uses a graphic arrangement that provides sufficient "grammar", "structure" and "meaning" for generating a computer-executable query. An aspect of the disclosed embodiment is to provide a new "language" that is an intuitive, simple graphic system or method for representing and generating search queries in software and hardware.

In one embodiment, graphical objects such as circles, rectangles, text, and other graphic objects are decoded by the graphical based query generation software routine 22 as the "vocabulary" for queries such as database queries. In addition, the types of lines used to draw these graphic objects are also included in the "vocabulary". How these elements of "vocabulary" are used together is the "sentence structure" of the "language" that generates the "grammar" and in so doing the "meaning" of the query. Queries can therefore be drawn using standard software drawing tools 20, such as for example a modified version of PC Paintbrush, where the pallet contains the graphic elements of the "vocabulary". The query generation software 22 then reads the graphic input, and generates a query, e.g., a SQL query.

As is the case with natural language query, once a graphic "sentence" representing a desired search is constructed it can be decoded (i.e., interpreted) into any query language by the query generation software, such as natural language, SQL, evaluation query expressions, and others, or fed into any existing search engine such as those found on the Internet.

As is the case with true "languages", the objects used for "words" may change without changing the result. A sentence in English and the same sentence in German still have the same meaning though the word objects are different and therein one can arrive at different embodiments of this invention. In a preferred embodiment of the invention, the following "dictionary" is used by the query generation software as a vocabulary:

Oval—Graphic object having a prescribed syntax for the Boolean operators "and" and "or".

Dashed Line Oval—Graphic object representing "search for a match of this at the beginning" of an alphanumeric string.

Alternating Dashed and Dotted Line Oval—Graphic object representing "search for a match of this entry at the end of an alphanumeric string".

Dotted Line Oval—Graphic object representing "search for a match of this entry anywhere".

Oval with a Slash through it—Graphic object representing "Not this entry".

Typed Words—Graphic object representing text to find (i.e., entries).

Selected Fields—Graphic object representing Database fields containing data.

Point Size the same between Type Words and Field Graphic Objects Graphic sizing representing Field Contents "=" (equal to) Type Words Object.

Point Size of Type Words smaller than that of Field Graphic Objects—Graphic sizing representing looking for Field Contents ">" (greater than) Type Words Object.

Point Size of Type Words larger than that of Field Graphic Objects—Graphic sizing representing looking for Field Contents "<" (less than) Type Words Object.

Point Size of Type Words the same as that of Field Graphic Objects but an Oval with a Slash surrounds the Type object—Graphic sizing representing looking for Field Contents "<>" (not equal to) Type Words Object.

In a second embodiment the "dictionary" may change for example, wherein the Graphic object representing a Boolean unit may have one shape when the objects enclosed have a Boolean "OR" relationship. The Graphic object representing a Boolean unit may have a second shape when the objects enclosed by the Graphic object have a Boolean "AND" relationship. Hence, the query generation software may have different "dictionaries" representing respective graphical vocabularies, where each configured for a corresponding user group (e.g., children, students, engineers, medical personnel, and the like) or application context.

As is the case with other "languages" the "grammar" is a construct of the "structure" of the "vocabulary". The query generation software uses the graphic "vocabulary" to structure graphically input objects using the "grammar" of Boolean logic to generate "meaning", for example for the searching of a database of records. In this method, one or more graphical objects that represent a Boolean query incorporating expressions are generated. One of many syntactical query expressions known to the art is then generated from the graphical objects. Then, a database search query from the syntactical expression is triggered. Finally, the database is searched for records that match the database search query.

Figure 6:
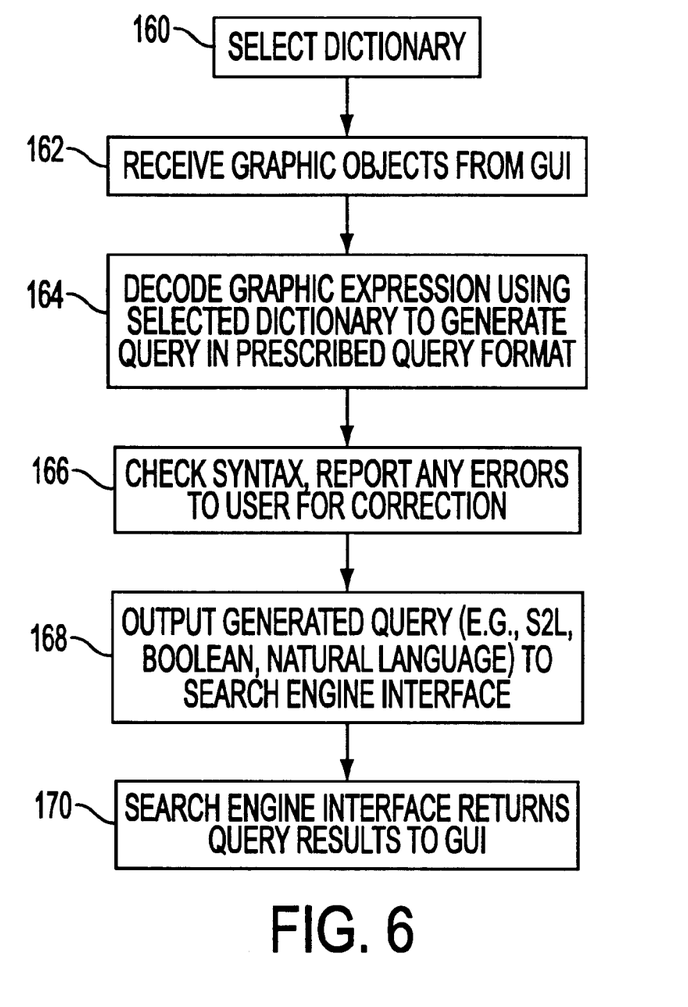
FIG. 6 is a flow diagram illustrating the method of graphically generating a search query according to an embodiment of the present invention.

A user formulates a search query using the query generation software 22 by typing and placing word or words they wish to find in either a structured, unstructured or hybrid databases onto a screen under the control of the GUI interface 20. Normally a dictionary 32 is selected by the software 22 based on prescribed user preferences in step 160 (FIG. 6). Then a word or words are enclosed by at least one line segment, such as a circle, ellipse, or square, for example to graphically indicate a particular Boolean relationship with the word or words enclosed by the line segment. In addition, the type of line segment, i.e., dashed or dotted, for example, also indicates a Boolean relationship between the word or words.

Further, if two or more words are encompassed by at least one line segment, the relative size of the words may indicate a particular expressional relationship between the words. A first example of generating a graphical search query according to the present invention is presented with reference to FIG. 1a.

Figure 1A:
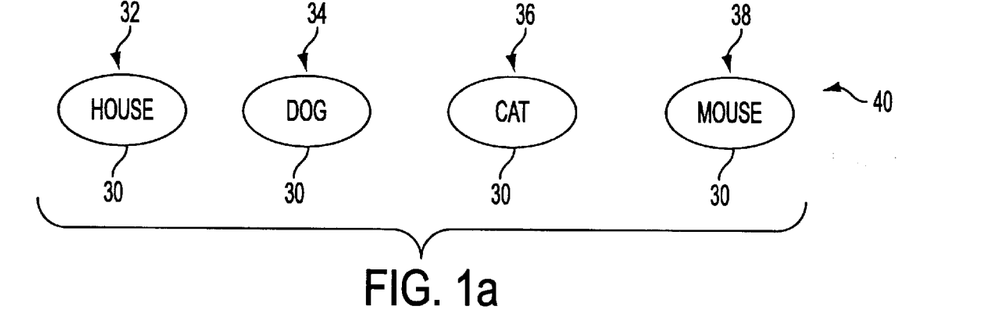
FIGS. 1a, 1b and 1c are diagrams illustrating a graphical representations of AND/OR/NOT-type Boolean relationships in accordance with an embodiment of the present invention.

In this example, a user wishes to generate a search query that will locate all the records in a database which include either the word house, dog, cat or mouse. This is represented in Boolean logic as: "House or Dog or Cat or Mouse." In one embodiment of the invention, in order to generate a graphical query presenting this desired search query, a user first types the word "house" and places it on a screen. Then user then encloses the word "house" with an enclosure 30, for example an ellipse, to form a graphical object 32. A mouse (16, FIG. 5) or pull-down menus of the GUI software 20 may achieve this. The user repeats this operation for the remaining words, "dog," "cat" and "mouse". The order is not relevant. For example, the user may type and place all the words on a screen first before individually enclosing each of the words. The resultant graphical query is shown in FIG. 1a, showing graphical objects 32, 34, 36, and 38.

In this embodiment of the invention, the Boolean expressions represented by each enclosure 30 are "ORed" together, meaning they represent the Boolean operator "OR". Objects inside an enclosure 30 are "ANDed" together, meaning they represent the Boolean operator "AND". In FIG. 1a, there are four graphical objects 32, 34, 36 and 38 defined by their respective enclosures 30, each representing a particular Boolean relationship, also referred to as a query element. Thus, the four Boolean relationships in each of the enclosures 30 are "ORed" together to form the Boolean query. In this example, a single word is present in each of the enclosures, so that the Boolean relationship in each of the enclosures is simply the word. As a consequence, the graphical query 40 shown in FIG. 1 a represents a Boolean expression ("House" OR "Dog" OR "Cat" OR "Mouse") as a combination of the query elements 32, 34, 36, and 38.

Once the user has completed the creation of a graphical query 40, the user may direct a database search to be performed. The software or program 22 receives the graphic objects 32, 34, 36 and 38 in step 162, and decodes it to generate the graphical query. There may be an interface between a common database and the graphical query in step 164. If there are no syntax errors in step 166 the query is output, as a tokenized data set that specifies logical and/or expressional relationships between the graphical objects, to the translator 23. The translator 23, in step 168 generates the appropriate search query required, for example, by Microsoft Access corresponding to the SQL expression represented by the graphical query.

Figure 1B:
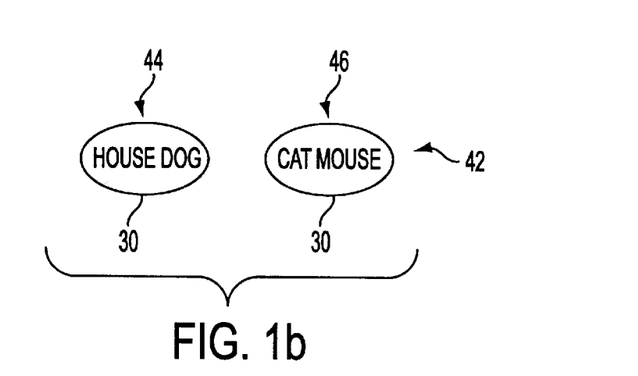

FIGS. 1b to 4c, represent examples of other graphical queries. In FIG. 1b, the user has developed a graphical query expression 42 for a structured, non-structured or hybrid database that locate all records that have either the words "house" and "dog" or the words "cat" or "mouse". In this figure, there are two graphic object enclosures 30 used to form graphical objects 44 and 46. The Boolean relationships represented in the two enclosures are "ORed" together. In this example, the one graphical object 44 contains the words "house" and "dog". As a consequence, these words are "ANDed" together; thus, the object 44 represents the Boolean expression: "House" AND "Dog", usable as a query element for a database query. The other object 46 contains the words cat and mouse. As a consequence, these words are "ANDed" together; thus, the object 46 represents the Boolean expression: "Cat" AND "Mouse". As noted above, the Boolean expression represented by the two objects 44 and 46 are "ORed" together. Therefore, the graphical query 42 shown in FIG. 1b represents the Boolean expression: ("House" AND "Dog") OR ("Cat" AND "Mouse").

Figure 1C:
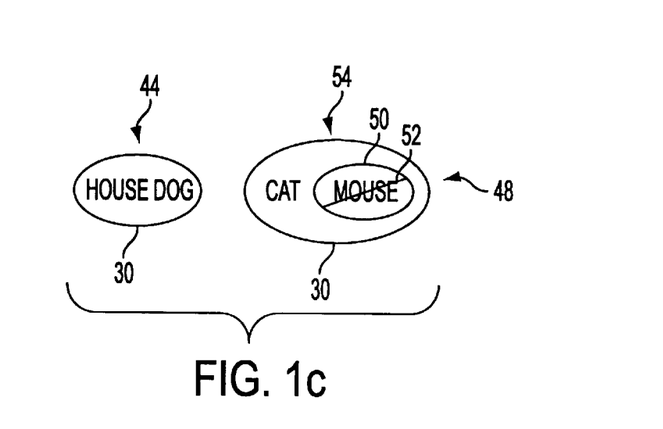

FIG. 1c represents a graphical query 48 similar to the query formulated and shown in FIG. 1b except that FIG. 1c includes another type of graphic object (i.e. vocabulary) that represents another type of Boolean expression. In this example, an enclosure with a line 52 through it is shown. In this embodiment of the invention, an enclosure 50 with a line 52 though it represents the Boolean operator "NOT". As a consequence, Boolean expressions inside an enclosure 50 with a line 52 through the enclosure are "NOTed". For example, in this case, in graphical object 54 the word mouse is "NOTed" and "ANDed" together with the word cat to form the Boolean expression: "Cat" AND (NOT "Mouse"). This expression is "ORed" with "House" AND "Dog" (as described above) to form the Boolean expression: ("House" AND "Dog") OR ("Cat" AND (NOT "Mouse")) in the graphical query expression 48.

FIGS. 2a to 2e show examples of graphical queries for structured or hybrid databases that have records with a field 60 denoted Ann_Inc (annual income). In this embodiment of the invention, when a field object is enclosed along with a word or value, the field object is compared to the word or value. In particular, as shown in these figures, the relative size of the field object to the word or value determines the evaluation relationship between the objects. For example, in FIG. 2a, the field expression Ann_Inc 60a is larger than the word or value 50,000.00. As a consequence, this object 62 represents the expression: Ann_Inc greater than (">") 50,000.00.

Figure 2A:
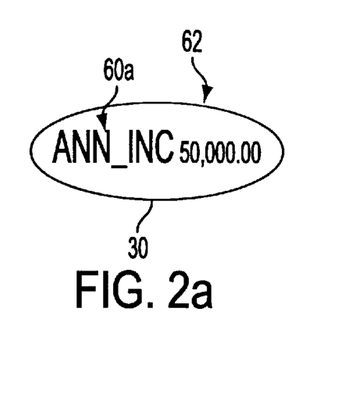
FIGS. 2a–2e are diagrams illustrating graphical representations of Boolean and expressional relationships between database fields and numeric values in accordance with an embodiment of the present invention.
Figure 2B:
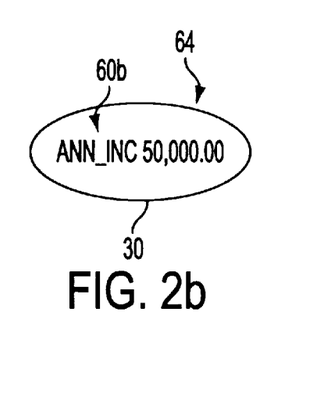
Figure 2C:
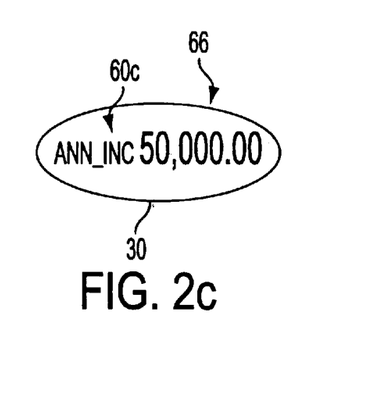

In the object 64 shown in FIG. 2b, the field object Ann_Inc 60b is the same size as the word or value 50,000.00. This object 64, thus, represents the expression: Ann_Inc equal to ("=") 50,000.00. Finally, in the object 66 shown in FIG. 2c, the field object Ann_Inc 60c is smaller than the word or value 50,000.00. This object 66, thus, represents the expression: Ann_Inc less than ("<") 50,000.00.

Figure 2D:
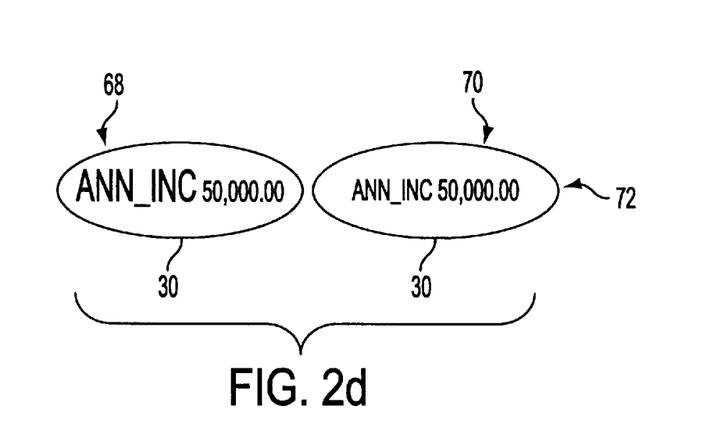

As before, if there are more than two enclosures 30 in a graphical query, the expressions represented by the two enclosures are "ORed" together. In FIG. 2d, there are two enclosures 30 defining respective graphic objects 68 and 70; thus, the expressions represented by the two objects 68 and 70 are "ORed" together to form a graphic query object 72. In this example, the first enclosure represents the expression: Ann_Inc ">" 50,000.00 and the second enclosure represents the expression: Ann_Inc "=" 50,000.00. Thus, the overall Boolean expression represented by the graphical query 72 shown in FIG. 2d is: (Ann_Inc ">" 50,000.00) OR (Ann_Inc "=" 50,000.00). As can seen from FIGS. 2a to 2d, the disclosed embodiment provides an intuitive way to graphically represent a Boolean relationship between a field object and a word or value.

Figure 2E:
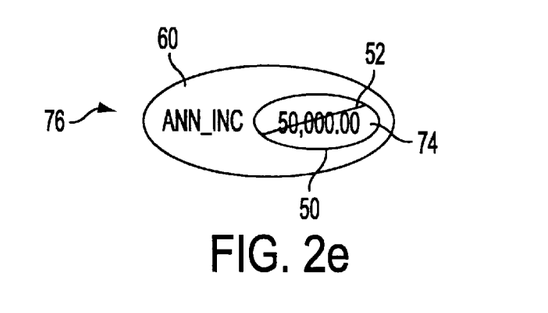

FIG. 2e shows a graphic representation 76 of another Boolean relationship between a field object 60 and word or value 74. In this Figure, the word or value 74 is enclosed and a line drawn through the enclosure 50. Thus, the graphical query 76 shown in FIG. 2e represents the expression: Ann_Inc <> 50,000.00 (i.e. Ann_Inc not equal to 50,000.00).

FIGS. 3a to 3e are examples of graphical queries that represent other query expressions. In these examples, the line segment 80 used to form the enclosure 30 is dashed, dotted, or both. The format of the line segment 80 modifies the expression or relationship of the objects enclosed by the line segment. In particular, when the line is dashed, dotted, or both, the expression represented by words or field objects inside the enclosure 30 formed by the dashed, dotted, or both types of line segment is modified. In this embodiment, a wild card is placed at the end of words or values enclosed by a dashed lined segment 80a to produce the meaning "search for words (in the text to be searched) for any word that begins with the enclosed text object". In addition, in this embodiment, a wild card is placed at the beginning of words or values enclosed by a dotted lined segment 80b to produce the meaning "search for words (in the text to be searched) for any word that ends with the enclosed text object". And finally in this embodiment, a wild card is placed at both the beginning and the end of words or values enclosed by a dashed-dotted lined segment 80c to produce the meaning "search for words (in the text to be searched) for any word that contains the enclosed text object".

Figure 3A:
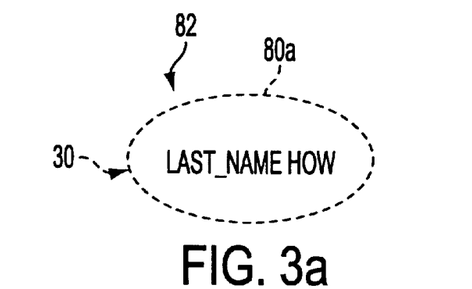
FIGS. 3a–3e are diagrams illustrating syntax definitions for search queries using partial keywords in accordance with an embodiment of the present invention.

For example, in FIG. 3a, the line segment 80a is dashed and encloses the expression Last_Name="How". The dashed line segment 80a, however, as noted above, places a wild card at the end of the word or value. Therefore, "How" is changed to "How*". Thus, the expression represented by the graphical object 82 in FIG. 3a is: Last_Name="How*". In this example a structured database with field object Last_Name is being searched for its' contents starting with the text "How". A wild card (in this case a *) placed at the end of a search word or value instructs a query engine to find all records in a database which have words in the particular field which start with the letters of search word preceding the "*".

Figure 3B:
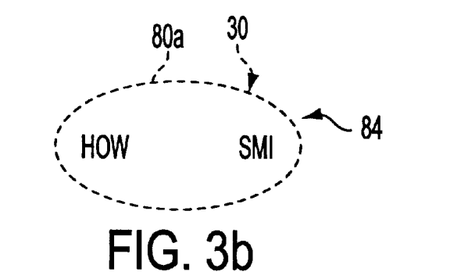

In FIG. 3b, the line segment 80a is also dashed and encloses the graphic representation of the Boolean expression "How" AND "Smi". The dashed line segments, however, as noted above, places a wild card at the end of the word or value. Therefore, "How" is changed to "How*" and "Smi" is changed to "Smi*". Thus, the expression represented by the graphical object 84 in FIG. 3b is: "How*" AND "Smi*".

Figure 3C:
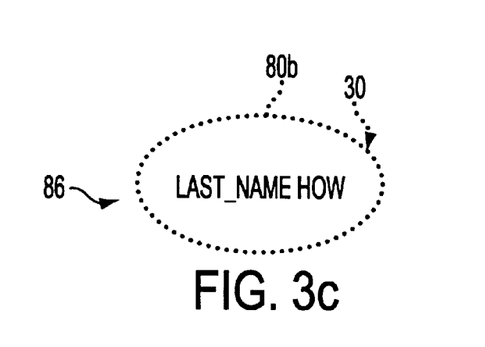

In FIG. 3c, the line segment 80b is dotted and encloses the graphic expression Last_Name="How". The dotted line segment 80b, however, as noted above, places a wild card at the beginning and end of the word or value. Thus, "How" is changed to "*How*". The expression represented by the graphical object 86 in FIG. 3c is: Last_Name="*How*". A wild card "*" placed at both the beginning and end of a word or value instructs a query engine to find all records in a database which have words in the particular field (if a structured search) which contain the letters of search word between the two "*"s. In this case, it tells the query engine to find all records whose field Last_Name with the letters "How" anywhere in a word in the field.

Figure 3D:
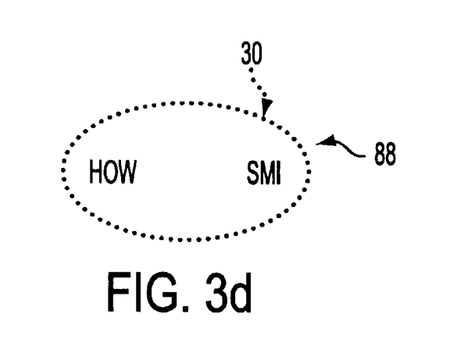

In FIG. 3d, the line segment 80b is also dotted and encloses the expression "How" and "Smi". The dotted line segment 80b, however, as noted above, places a wild card at the beginning and the end of the word or value. Therefore, "How" is changed to "*How*" and "Smi" is changed to "*Smi*". Thus, the Boolean expression represented by the graphical query 88 in FIG. 3d is: "*How*" AND "*Smi*".

Figure 3E:
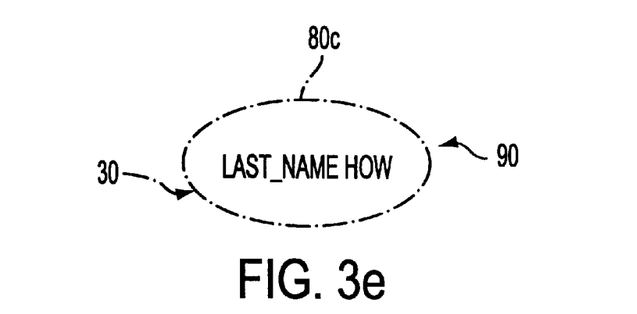

In FIG. 3e, the line segment 80c is dashed-dotted and encloses the graphic expression Last_Name="How". The dashed-dotted line segment, however, as noted above, places a wild card at the beginning of the word or value. Thus, "How" is changed to "*How". The expression represented by the graphical query 90 in FIG. 3c is: Last_Name="*How". A wild card "*" placed at the beginning of a word or value instructs a query engine to find all records in a database which have words in the particular field (if a structured search) which end with the letters of search word beginning with the "*"s. In this case, it tells the query engine to find all records whose field Last_Name with the letters "How" at the end of a word in the field.

For more complicated search queries, different enclosure shapes may be used to denote different Boolean relationships between the words, values, fields, or other graphic object enclosures. Examples are presented by reference to FIGS. 4a to 4c. Hence, different dictionaries may provide different meanings for a given graphical object.

Figure 4A:
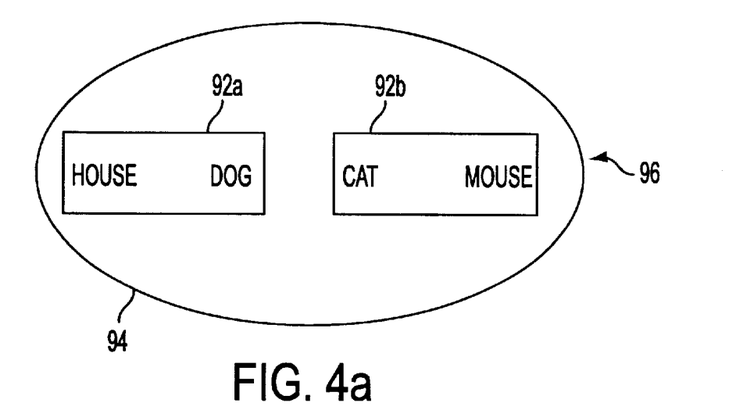
FIGS. 4a–4c are diagrams illustrating graphical representations of compound Boolean expressions in accordance with a second embodiment of the present invention.

In these figures the dictionary contains, graphic objects 92 which are rectangular in shape, i.e., have four right angles, denote "ANDing" the words, fields, values and other graphic objects enclosed therein together. In this embodiment, Graphic objects 94 that are elliptical or circular in shape denote "ORing" the words, fields, values and other graphic objects enclosed therein together. For example, the graphical query 96 in FIG. 4a consists of three graphic objects, two rectangular, and one elliptical or circular. A rectangular object 92a encloses the words "House" and "Dog"; thus, this graphic query "sentence" 92a represents the Boolean expression: "House" AND "Dog". In addition, a rectangular object 92b also encloses the words "Cat" and "Mouse"; thus, this enclosure represents 92b the Boolean expression: "Cat" AND "Mouse". Finally, the two rectangular objects 92a and 92b are enclosed by an elliptical or circular object 94; thus, the Boolean expressions 96 represented by the two rectangular objects 92a and 92b are "ORed" together. Therefore, the overall Boolean expression 96 represented by the graphic "sentence" of FIG. 4a is: ("House" AND "Dog") OR ("Cat" AND "Mouse").

Figure 4B:
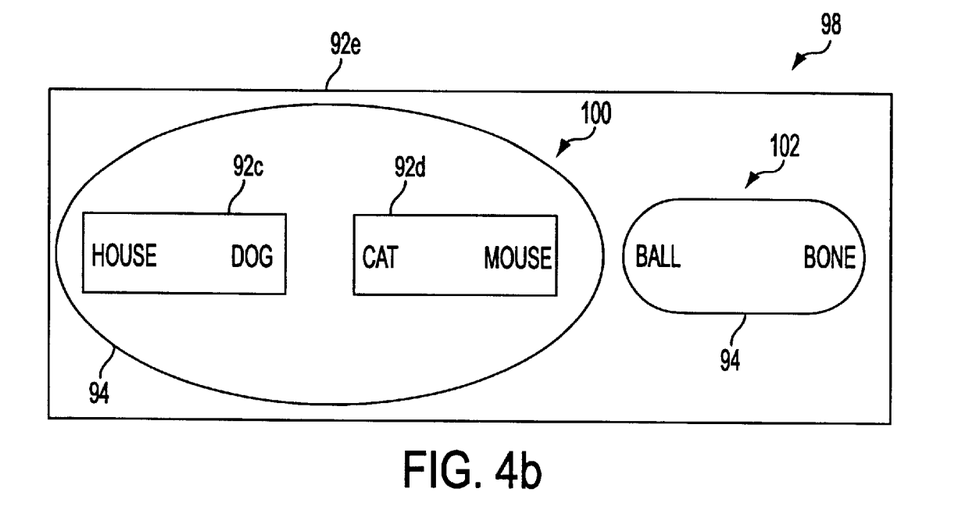

The graphical query 98 shown in FIG. 4b includes three rectangular objects and two elliptical objects. One rectangular object 92c encloses the words "House" and "Dog" and another rectangular object 92d encloses the words "Cat" and "Mouse". Thus, this graphic "sentence" 100 represent the Boolean expression shown in the figure is: ("House" AND "Dog") and ("Cat" and "Mouse"), respectively. An elliptical object 94 encloses the words "Ball" and "Bone"; thus, this graphic "sentence" 102 represents the Boolean expression: "Ball" OR "Bone". In addition, an elliptical object 94 encloses the two rectangular objects 92c and 92d. Thus, this graphic "sentence" 100 represents: ("House" AND "Dog") OR ("Cat" AND "Mouse"). This elliptical object 100 and the elliptical object 102 enclosing the words "Ball" and "Bone" are both enclosed by a rectangular object 92e. Thus, the overall Boolean expression represented by the graphical query "sentence" shown in FIG. 4b is: (("House" AND "Dog") OR ("Cat" AND "Mouse")) AND ("Ball" OR "Bone").

Figure 4C:
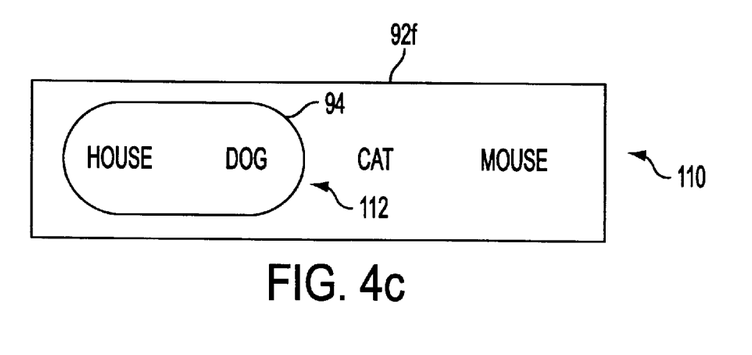

FIG. 4c represents a example 110 of a graphical "sentence" according to an embodiment of the present invention. In this query, there is one rectangular object 92f and one elliptical object 94. The graphical object 112 encloses the words "House" and "Dog"; thus, represents the Boolean expression: "House" OR "Dog". The rectangular object 92f encloses the elliptical object and the words "Cat" and "Mouse". Thus, the graphical query "sentence" 110 shown in FIG. 4c represents the Boolean expression: (("House" OR "Dog") AND "Cat" AND "Mouse").

Note the graphic expression builder 22 of FIG. 5 may permit the user to save, recall, or modify a previously saved or recalled graphical query. The graphical queries may be saved to or recalled from the storage medium 54 or other storage area (such as disk on the WAN, LAN, Internet, or disk of another system to which the computer system 50 is connected via a modem).

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of graphically generating a query expression for use by a database system comprising the steps of:
   first generating graphical objects, representing prescribed query elements according to a prescribed syntax, in response to user inputs to a graphic user interface; and
   second generating the query elements from the graphical objects based on a correlation thereof with the prescribed syntax, said graphical objects syntactically encapsulating the vocabulary, structure, and meaning of at least one of a Boolean operator, arithmetic value relationship, or wild card expression thereby defining the search in its entirety.

2. A method according to claim 1, wherein the graphical objects include at least one enclosure enclosing at least a second of the other graphical objects.

3. A method according to claim 2, wherein the second generating step includes selecting a query relation for the at least the second of the other graphical objects based on a line segment format of the enclosure.

4. A method according to claim 3, wherein the selecting step includes determining an expressional relationship of the at least the second of the other graphical objects enclosed by the enclosure based on a shape of the enclosure.

5. A method according to claim 4, wherein the determining step includes identifying one of a Boolean OR relationship and a Boolean AND relationship based on an arrangement of the other graphical objects within the enclosure.

6. A method according to claim 2, second generating step includes identifying an expressional relationship between at least two of the graphical objects based on respective sizes of the at least two graphical objects.

7. A method according to claim 6, wherein a first and second of the at least two objects have first and second sizes, respectively, the expressional relationship of the first of the two objects and the second of the two objects being the first object greater than the second object if the first size is greater than the second object, the expressional relationship of the first object and the second object being the first object less than the second object if the first size is less than the second size, and the expressional relationship of the first object and the second object being equal if the first size is equal to the second size.

8. The method of claim 2, wherein the second generating step includes selecting at least one of a logical and expressional relationship between the objects based on a selected dictionary that specifies the prescribed syntax.

9. The method of claim 8, further comprising outputting the query elements to a query translator for generation of the query expression according to a prescribed format.

10. A method of graphically generating a database search query, comprising the steps of:
    a) first generating one or more graphical objects which represent respective query elements;
    b) second generating query elements from the graphical objects; and
    c) third generating the database search query from the query elements, said graphical objects syntactically encapsulating the vocabulary, structure, and meaning of at least one of a Boolean operator, arithmetic value relationship, or wild card expression thereby defining the search in its entirety.

11. A method according to claim 10, wherein the graphical objects include at least one enclosure enclosing at least a second of the other graphical objects.

12. A method according to claim 11, wherein the second generating step includes selecting a query relation for the at least the second of the other graphical objects based on a line segment format of the enclosure.

13. A method according to claim 12, wherein the selecting step includes determining a Boolean relationship of the at least the second of the other graphical objects enclosed by the enclosure based on a shape of the enclosure.

14. A method according to claim 13, wherein the determining step includes identifying one of a Boolean OR relationship and a Boolean AND relationship based on an arrangement of the other graphical objects within the enclosure.

15. A method according to claim 14, wherein the second generating step includes identifying an expressional relationship between at least two of the graphical objects based on respective sizes of the at least two graphical objects.

16. A method according to claim 13, wherein a first and second of the at least two objects have first and second sizes, respectively, the expressional relationship of the first of the two objects and the second of the two objects being the first object greater than the second object if the first size is greater than the second size, the expressional relationship of the first object and the second object being the first object less than the second object if the first size is less than the second size, and the expressional relationship of the first object and the second object being equal if the first size is equal to the second size.

17. The method of claim 11, wherein the second generating step includes selecting at least one of a logical and expressional relationship between the objects based on a selected dictionary that specifies the prescribed syntax.

18. The method of claim 17, wherein the third generating step includes outputting the query elements to a query translator for generation of the query expression according to a prescribed format.

19. A method of searching a database of records, comprising the steps of:
 a) first generating one or more graphical objects which represent respective query elements;
 b) second generating the query elements from the graphical objects;
 c) third generating a database search query from the query elements; and
 d) searching for records in the database based on the database search query,
  wherein said graphical objects syntactically encapsulate the vocabulary, structure, and meaning of at least one of a Boolean operator, arithmetic value relationship, or wild card expression thereby defining the search in its entirety.

20. A method according to claim 19, wherein the graphical objects include at least a second of the enclosure enclosing at least one other graphical object and the second generating step includes selecting a query relation for the at least the second of the other graphical objects based on a line segment format of the enclosure.

21. A method according to claim 20, wherein the selecting step includes determining a Boolean relationship of the at least the second of the other graphical objects enclosed by the enclosure based on a shape of the enclosure, the determining step including identifying one of a Boolean OR relationship and a Boolean AND relationship based on the shape of the enclosure.

22. A method according to claim 21, wherein the second generating step includes identifying an expressional relationship between at least two of the graphical objects based on respective sizes of the at least two graphical objects.

23. A method according to claim 22, wherein a first and second of the at least two objects have first and second sizes, respectively, the expressional relationship of the first of the two objects and the second of the two objects being the first object greater than the second object if the first size is greater than the second object, the expressional relationship of the first object and the second object being the first object less than the second object if the first size is less than the second size, and the expressional relationship of the first object and the second object being equal if the first size is equal to the second size.

24. The method of claim 11, wherein the second generating step includes selecting at least one of a logical and expressional relationship between the objects based on a selected dictionary that specifies the prescribed syntax.

25. The method of claim 17, wherein the third generating step includes outputting the query elements to a query translator for generation of the query expression according to a prescribed format.

26. An apparatus for generating a search query for a database of records, comprising:
 a graphic user interface configured for generating graphical objects in response to user inputs; and
 a graphic query generator for generating the search query according to a prescribed syntax based on the graphical objects, said graphical objects syntactically encapsulating the vocabulary, structure, and meaning of at least one of a Boolean operator, arithmetic value relationship, or wild card expression thereby defining the search in its entirety.

27. An apparatus according to claim 26, wherein the graphical objects include at least one enclosure enclosing at least one other graphical object and the enclosure includes at least one line segment, the graphic query generator selecting a query relation of objects enclosed by the enclosure based on a format of the line segment varies according to a Boolean relationship.

28. An apparatus according to claim 27, wherein graphic query generator identifies a Boolean relationship of objects enclosed by the enclosure and the enclosure as one of a Boolean OR relationship and a Boolean AND relationship based on a shape of the enclosure.

29. An apparatus according to claim 28, wherein the enclosure encloses a first object having a first size and a second object having a second size, the graphic query generator determines an expressional relationship between the first object and the second object based on the respective first and second sizes.

30. An apparatus according to claim 29, wherein the graphic query generator determines that the first object is greater than the second object if the first size is greater than the second size, the Boolean relationship of the first object and the second object is the first object is less than the second object if the first size is less than the second size, and the first object is equal to the second object if the first size is equal to the second size.

* * * * *